(12) United States Patent
Takahashi

(10) Patent No.: US 9,219,345 B2
(45) Date of Patent: Dec. 22, 2015

(54) OPTICAL AMPLIFICATION CONTROL APPARATUS AND CONTROL METHOD OF THE SAME

(75) Inventor: Yurie Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/344,257

(22) PCT Filed: Aug. 30, 2012

(86) PCT No.: PCT/JP2012/005500
§ 371 (c)(1),
(2), (4) Date: Mar. 11, 2014

(87) PCT Pub. No.: WO2013/042321
PCT Pub. Date: Mar. 28, 2013

(65) Prior Publication Data
US 2015/0009555 A1    Jan. 8, 2015

(30) Foreign Application Priority Data
Sep. 20, 2011    (JP) .................................. 2011-205101

(51) Int. Cl.
*H01S 3/00* (2006.01)
*H01S 3/10* (2006.01)
(Continued)

(52) U.S. Cl.
CPC ........ *H01S 3/10023* (2013.01); *H04B 10/2939* (2013.01); *H04J 14/021* (2013.01); *H04J 14/0221* (2013.01); *H04J 14/0241* (2013.01);
(Continued)

(58) Field of Classification Search
CPC . H01S 3/1022; H01S 3/10015; H01S 3/1301; H04B 10/293
USPC ....................................................... 359/337
See application file for complete search history.

(56) References Cited

U.S. PATENT DOCUMENTS

| | | | |
|---|---|---|---|
| 6,721,090 B2 * | 4/2004 | Akiyama | .................... 359/341.3 |
| 7,362,498 B1 * | 4/2008 | Li et al. | .................... 359/341.41 |
| 2002/0080473 A1 | 6/2002 | Akiyama | |

FOREIGN PATENT DOCUMENTS

| | | |
|---|---|---|
| CN | 1177240 A | 3/1998 |
| CN | 1193752 A | 9/1998 |

(Continued)

OTHER PUBLICATIONS

International Search Report for PCT Application No. PCT/JP2012/005500, mailed on Nov. 6, 2012.

(Continued)

*Primary Examiner* — Mark Hellner

(57) ABSTRACT

An optical amplification control apparatus is provided with: a first branch unit for branching an optical signal to which an additional optical signal with a predetermined wavelength has been added in a self node or a nearest node; a first filter unit for extracting the additional optical signal from one optical signal into which the first branch unit has branched; an amplification unit for amplifying the other optical signal into which the first branch unit has branched; a second branch unit for branching the optical signal amplified by the amplification unit; a second filter unit for extracting the additional optical signal from one optical signal into which the second branch unit has branched; and a first control unit for performing automatic gain control of the amplification unit based on the additional optical signal extracted by the first filter unit, and the additional optical signal extracted by the second filter unit.

16 Claims, 3 Drawing Sheets

(51) Int. Cl.
  *H04B 10/293*  (2013.01)
  *H04J 14/02*  (2006.01)
  *H01S 3/13*  (2006.01)
(52) U.S. Cl.
  CPC ........... *H01S 3/10015* (2013.01); *H01S 3/1301* (2013.01)

(56) References Cited

FOREIGN PATENT DOCUMENTS

| CN | 1614910 A | 5/2005 |
|---|---|---|
| EP | 0805571 A2 | 11/1997 |
| JP | 2000-223764 A | 8/2000 |
| JP | 2001-284689 A | 10/2001 |
| JP | 2003-23399 A | 1/2003 |
| JP | 2003-209309 A | 7/2003 |
| JP | 2004-363631 A | 12/2004 |
| JP | 2008-141673 A | 6/2008 |

OTHER PUBLICATIONS

Chinese Office Action for CN Application No. 201280045195.0 mailed on Sep. 6, 2015 with English Translation.

\* cited by examiner

OPTICAL AMPLIFICATION CONTROL APPARATUS AND CONTROL METHOD OF THE SAME

This application is a National Stage Entry of PCT/JP2012/005500 filed Aug. 30, 2012, which claims priority from Japanese Patent Application 2011-205101 filed Sep. 20, 2011, the contents of all of which are incorporated herein by reference, in their entirety.

TECHNICAL FIELD

The present invention relates to an optical amplification control apparatus and a control method of the same that control amplification of an optical signal in a network.

BACKGROUND ART

In recent years, along with practical use of WDM (Wavelength Division Multiplexing), application of this WDM to a network with a ring or mesh configuration has been expanded. In such network, an optical signal with an arbitrary wavelength is branched or inserted from a transmission path fiber using technologies, such as ROADM (Reconfigurable Optical Add Drop Multiplexing) and WXC (Wavelength Crossconnect), and the network is characterized in that a termination point does not exist as in a Point-to-Point network.

In addition, in the above-described ROADM, WXC, etc., AGC (Automatic Gain Control) control using input and output signals of an optical amplifier is performed (for example, refer to Patent Literatures 1, 2, and 3).

CITATION LIST

Patent Literature

Patent Literature 1: Japanese Unexamined Patent Application Publication No. 2000-223764
Patent Literature 2: Japanese Unexamined Patent Application Publication No. 2003-209309
Patent Literature 3: Japanese Unexamined Patent Application Publication No. 2004-363631

SUMMARY OF INVENTION

Technical Problem

By the way, in a WDM signal input to an optical amplifier from an upstream transmission path, power fluctuation may occur due to effects of polarization dependency of the transmission path and loss fluctuation, etc. Furthermore, when AGC control is performed following the above-described power fluctuation, an optical signal added at a node in which fluctuation has not occurred is also affected by the fluctuation due to a signal transmitted from the upstream transmission path after amplification in the optical amplifier (fluctuation transfer), which leads to deterioration of accuracy of the AGC control. Furthermore, in a case of a network configuration that does not have a termination point of a signal as in a ring network, since power fluctuation is propagated in a ring, a resonance condition is satisfied, and oscillation may occur.

It is to be noted that in order to suppress propagation of the above-described power fluctuation, for example, a method using ALC control (Automatic Level Control) is assumed. In that case, in order to keep an output per wavelength constant, a need arises to control a total output power target value of the optical amplifier based on information of the number of input wavelengths to the optical amplifier. Accordingly, when the number of wavelengths input to the optical amplifier is rapidly changed, and a difference occurs between the number of input wavelengths and the actual number of wavelengths, a problem occurs that an optical output power per wavelength changes.

The present invention has been made to solve such problem, and a main object thereof is to provide an optical amplification control apparatus and a control method of the same that can control amplification of an optical signal in a network with high accuracy.

Solution to Problem

One aspect of the present invention to achieve the above-described object is an optical amplification control apparatus characterized by being provided with: first branch means for branching an optical signal to which an additional optical signal with a predetermined wavelength has been added in a self node or a nearest node; first filter means for extracting the additional optical signal from one optical signal into which the first branch means has branched; amplification means for amplifying the other optical signal into which the first branch means has branched; second branch means for branching the optical signal amplified by the amplification means; second filter means for extracting the additional optical signal from one optical signal into which the second branch means has branched; and first control means for performing automatic gain control of the amplification means based on the additional optical signal extracted by the first filter means, and the additional optical signal extracted by the second filter means.

On the other hand, one aspect of the present invention to achieve the above-described object may be a control method of an optical amplification control apparatus characterized in that an optical signal to which an additional optical signal with a predetermined wavelength has been added is branched in a self node or a nearest node, the additional optical signal is extracted from one optical signal branched from the optical signal to which the additional optical signal with the predetermined wavelength has been added, the other optical signal branched from the optical signal to which the additional optical signal with the predetermined wavelength has been added is amplified, the amplified optical signal is branched, the additional optical signal is extracted from one optical signal branched from the amplified optical signal, and that automatic gain control of the amplification is performed based on the extracted additional optical signal.

Advantageous Effects of Invention

According to the present invention, can be provided an optical amplification control apparatus and a control method of the same that can control amplification of an optical signal in a network with high accuracy.

DESCRIPTION OF EMBODIMENTS

Figure 1:
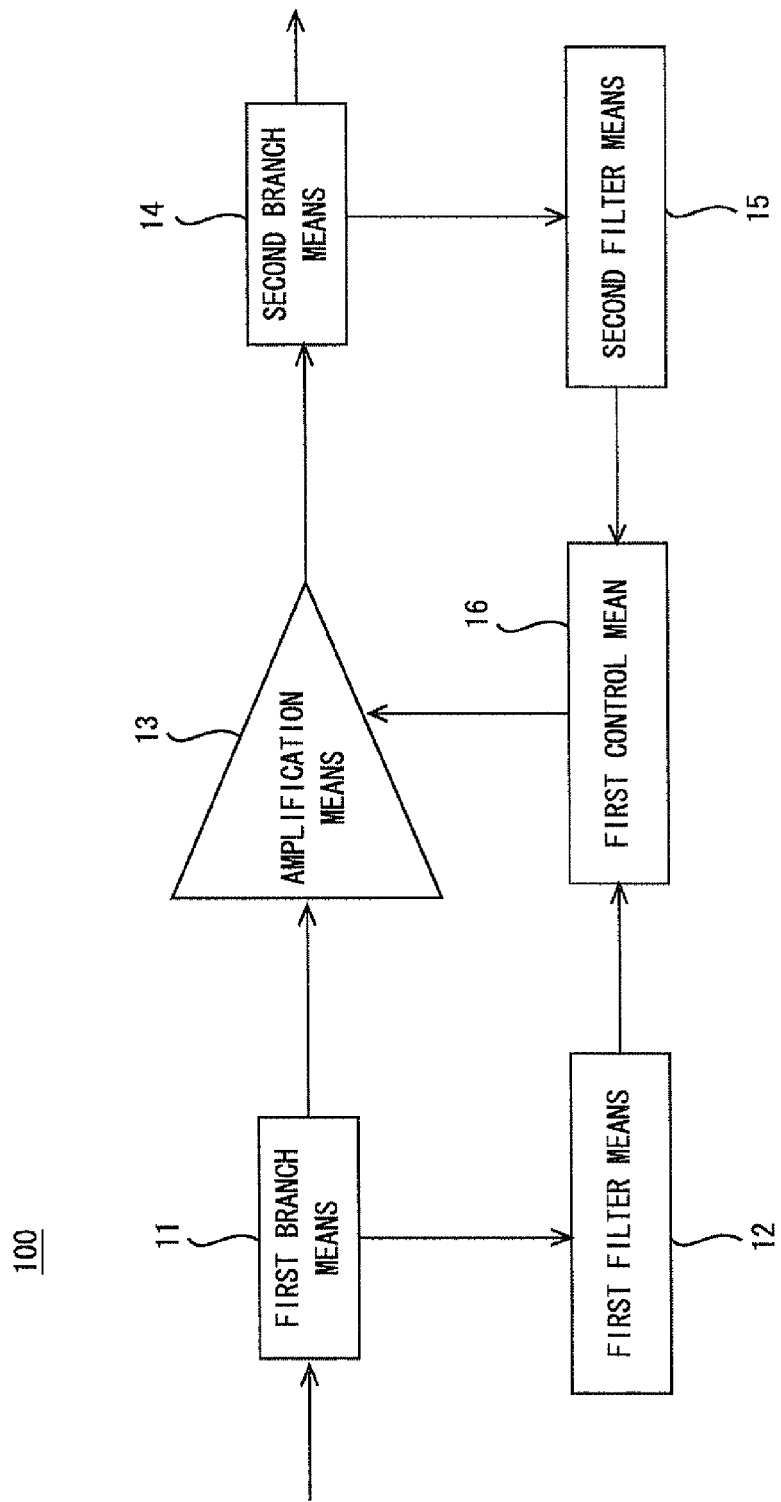
FIG. 1 is a functional block diagram of an optical amplification control apparatus pertaining to one embodiment of the present invention.

Hereinafter, an embodiment of the present invention will be explained with reference to drawings. FIG. 1 is a functional block diagram of an optical amplification control apparatus pertaining to one embodiment of the present invention.

An optical amplification control apparatus 100 pertaining to the embodiment is provided with: first branch means 11 for branching an optical signal to which an additional optical signal with a predetermined wavelength has been added in a self node or a nearest node; first filter means 12 for extracting the additional optical signal from one optical signal into which the first branch means 11 has branched; amplification means 13 for amplifying the other optical signal into which the first branch means 11 has branched; second branch means 14 for branching the optical signal amplified by the amplification means 13; second filter means 15 for extracting the additional optical signal from one optical signal into which the second branch means 14 has branched; and first control means 16 for performing automatic gain control of the amplification means 13 based on the additional optical signal extracted by the first filter means 12, and the additional optical signal extracted by the second filter means 15.

As described above, automatic gain control of the amplification means 13 is performed using the additional optical signal that cannot be easily affected by an effect of optical output fluctuation, such as polarization dependency of a transmission path (hereinafter referred to as transmission path polarization dependency) and loss fluctuation, thereby the effect by the optical output fluctuation can be suppressed, and resonance in a network can be reliably prevented. Namely, amplification of the optical signal in the network can be controlled with high accuracy.

Figure 2:
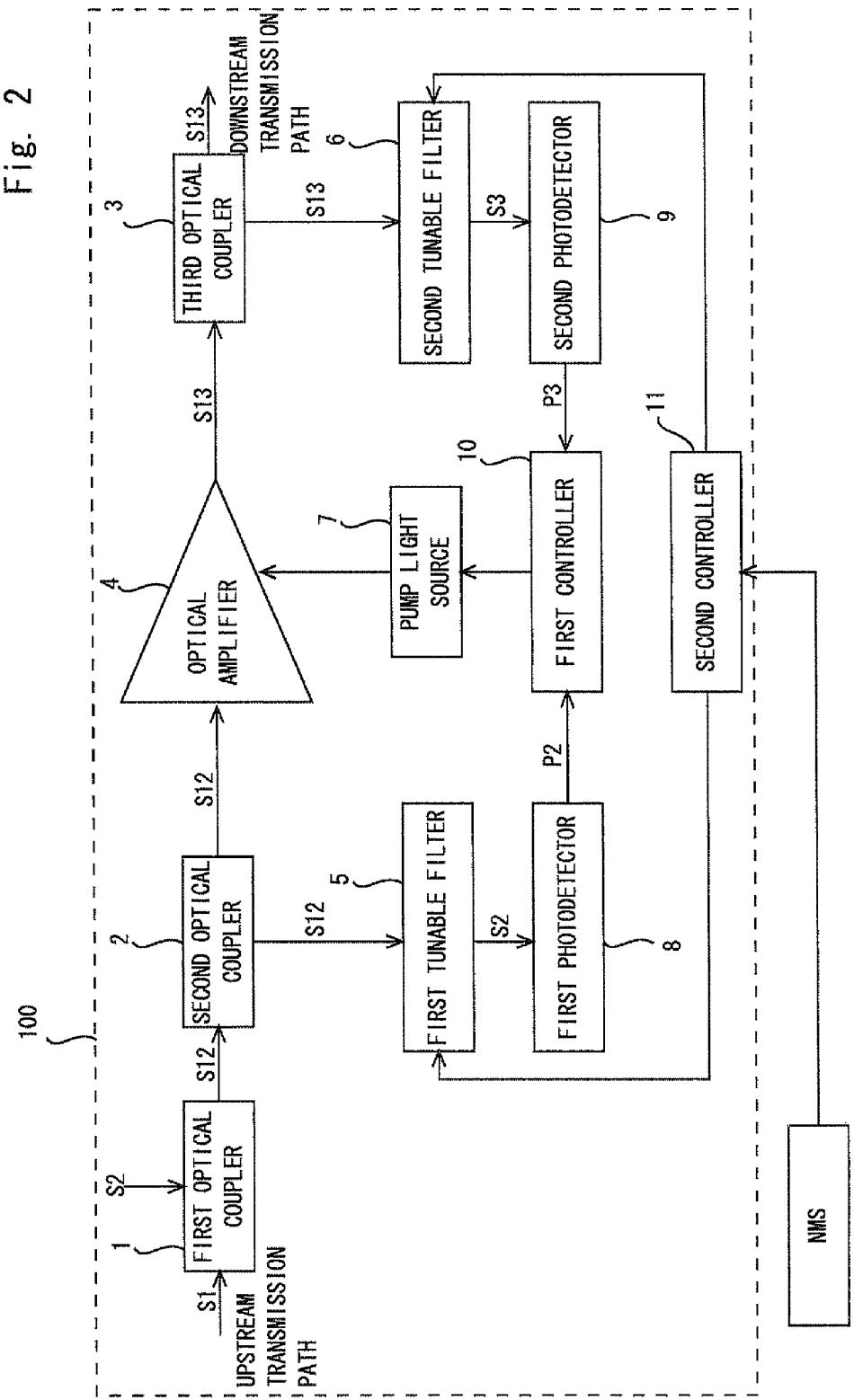
FIG. 2 is a block diagram showing a schematic configuration of the optical amplification control apparatus pertaining to the one embodiment of the present invention.

FIG. 2 is a block diagram showing a schematic configuration of the optical amplification control apparatus pertaining to the one embodiment of the present invention. The optical amplification control apparatus 100 pertaining to the embodiment is the apparatus that is, for example, provided in a network with a ring configuration, suppresses the effect by the optical output fluctuation, and that thereby controls amplification of an optical signal transmitted in the network with high accuracy.

The optical amplification control apparatus 100 is provided with: a first optical coupler 1; a second optical coupler 2; a third optical coupler 3; an optical amplifier 4; a first tunable filter 5; a second tunable filter 6; a pump light source 7; a first photodetector 8; a second photodetector 9; a first controller 10; and a second controller 11.

The first optical coupler (self node) 1 is one specific example of addition means, multiplexes an additional optical signal with a predetermined wavelength $\lambda 2$ (additional optical signal) S2 with respect to a WDM (Wavelength Division Multiplexing) optical signal S1 transmitted from an upstream transmission path, and outputs a multiplexed WDM optical signal S12 to the second optical coupler 2. It is to be noted that although the additional optical signal S2 is added in the first optical coupler 1, the present invention is not limited to this, and the additional optical signal S2 can be added in an arbitrary self node.

The second optical coupler 2 is one specific example of the first branch means, branches the WDM optical signal S12 multiplexed by the first optical coupler 1 into two, outputs one branch WDM optical signal S12 to the first tunable filter 5, and outputs the other WDM optical signal S12 to the optical amplifier 4.

The first tunable filter 5 is one specific example of the first filter means, extracts the additional optical signal S2 from the one WDM optical signal S12 into which the second optical coupler 2 has branched, and outputs the extracted additional optical signal S2 to the first photodetector 8.

The first photodetector 8 is one specific example of first conversion means, and has a function as an input monitor. The first photodetector 8 measures a power P2 of the additional optical signal S2 extracted by the first tunable filter 5, and outputs the measured power P2 of the additional optical signal S2 to the first controller 10 as an input monitor value (electrical signal) P2.

The optical amplifier 4 is one specific example of amplification means, amplifies an intensity of the other WDM optical signal S12 output from the second optical coupler 2 using an excitation light output from the pump light source 7, and outputs an amplified WDM optical signal S13 to the third optical coupler 3.

The third optical coupler 3 is one specific example of the second branch means, branches the WDM optical signal S13 amplified by the optical amplifier 4 into two, outputs one branch WDM optical signal S13 to the second tunable filter 6, and outputs the other WDM optical signal S13 to a downstream transmission path.

The second tunable filter 6 is one specific example of the second filter means, extracts an additional optical signal S3 from the one WDM optical signal S13 into which the third optical coupler 3 has branched, and outputs the extracted additional optical signal S3 to the second photodetector 9.

The second photodetector 9 is one specific example of second conversion means, and has a function as an output monitor. The second photodetector 9 measures a power P3 of the additional optical signal S3 extracted by the second tunable filter 6, and outputs the measured power P3 of the additional optical signal S3 to the first controller 10 as an output monitor value (electrical signal) P3.

The first controller 10 is one specific example of first control means, for example, performs AGC control (Automatic Gain Control) so that a ratio (P2/P3) of the input monitor value P2 output from the first photodetector 8 and the output monitor value P3 output from the second photodetector 9 becomes constant, and outputs a control signal of the AGC control to the pump light source 7. It is to be noted that the above-described AGC control method is one example, the present invention is not limited to this, and that, for example, PID control etc. may be used.

As described above, the AGC control is performed based on the ratio of the input monitor value P2 and the output monitor value P3 that indicates a ratio of powers of the additional optical signal before and after the optical amplifier 4, thereby the gain of amplification becomes constant regardless of the number of wavelengths of the optical signal input to the optical amplifier 4, and as a result of it, an optical power per wavelength does not change.

The pump light source 7 is one specific example of light source means, and outputs the excitation light to the optical amplifier 4 in accordance with the control signal output from the first controller 10.

The second controller 11 is one specific example of second control means, and controls a selected wavelength of an optical signal made to penetrate through the first tunable filter 5 and a selected wavelength of an optical signal made to penetrate through the second tunable filter 6 based on information of an additional optical signal received from an external (for example, an NMS (network management system) provided in the network, etc.). For example, the second controller 11 controls the selected wavelengths in the first and second tunable filters 5 and 6 to be the wavelength $\lambda 2$ of the additional optical signals S2 and S3, respectively based on wavelength information of the additional optical signals S2 and S3. As a result of this, the additional optical signals S2 and S3 from the self node, in which the above-described optical output fluctuation is a minimum, can be selected and made to penetrate.

It is to be noted that although in the embodiment, has been explained a case where a single additional optical signal is used, the present invention is not limited to this, and a configuration using a plurality of additional optical signals may be employed, and that in this case, the second controller 11 controls the above-described selected wavelengths, for example, to be a wavelength closer to a center of a transmission band.

By the way, in a WDM signal input to an optical amplifier from an upstream transmission path, power fluctuation may occur by effects of optical output fluctuation, such as transmission path polarization dependency and loss fluctuation. When AGC control is performed following the above-described power fluctuation in a conventional optical amplification control apparatus, an optical signal added by an optical coupler in which fluctuation has not occurred is also affected by the fluctuation due to a signal transmitted from the upstream transmission path after amplification in the optical amplifier (fluctuation transfer). For example, in a case of a network configuration that does not have a termination point of a signal as in a ring network, since power fluctuation is propagated in a ring, a resonance condition is satisfied, and oscillation may occur.

Consequently, in the optical amplification control apparatus 100 pertaining to the embodiment, the second optical coupler 2 branches an optical signal to which an additional optical signal with a predetermined wavelength has been added in the first optical coupler 1 that is the self node, the first tunable filter 5 extracts the additional optical signal from one optical signal into which the second optical coupler 2 has branched, the optical amplifier 4 amplifies the other optical signal into which the second optical coupler 2 has branched, the third optical coupler 3 branches the optical signal amplified by the optical amplifier 4, the second tunable filter 6 extracts the additional optical signal from one optical signal into which the third optical coupler 3 has branched, and the first controller 10 performs AGC control of the optical amplifier 4 based on the additional optical signal extracted by the first tunable filter 5 and the additional optical signal extracted by the second tunable filter 6.

As described above, the AGC control is performed only using the additional optical signal that cannot be easily affected by the effect by the above-described optical output fluctuation, such as transmission path polarization dependency and loss fluctuation, thereby the above-described fluctuation transfer is suppressed, and oscillation in the network can be reliably prevented. Namely, amplification of the optical signal in the network can be controlled with high accuracy.

Figure 3:
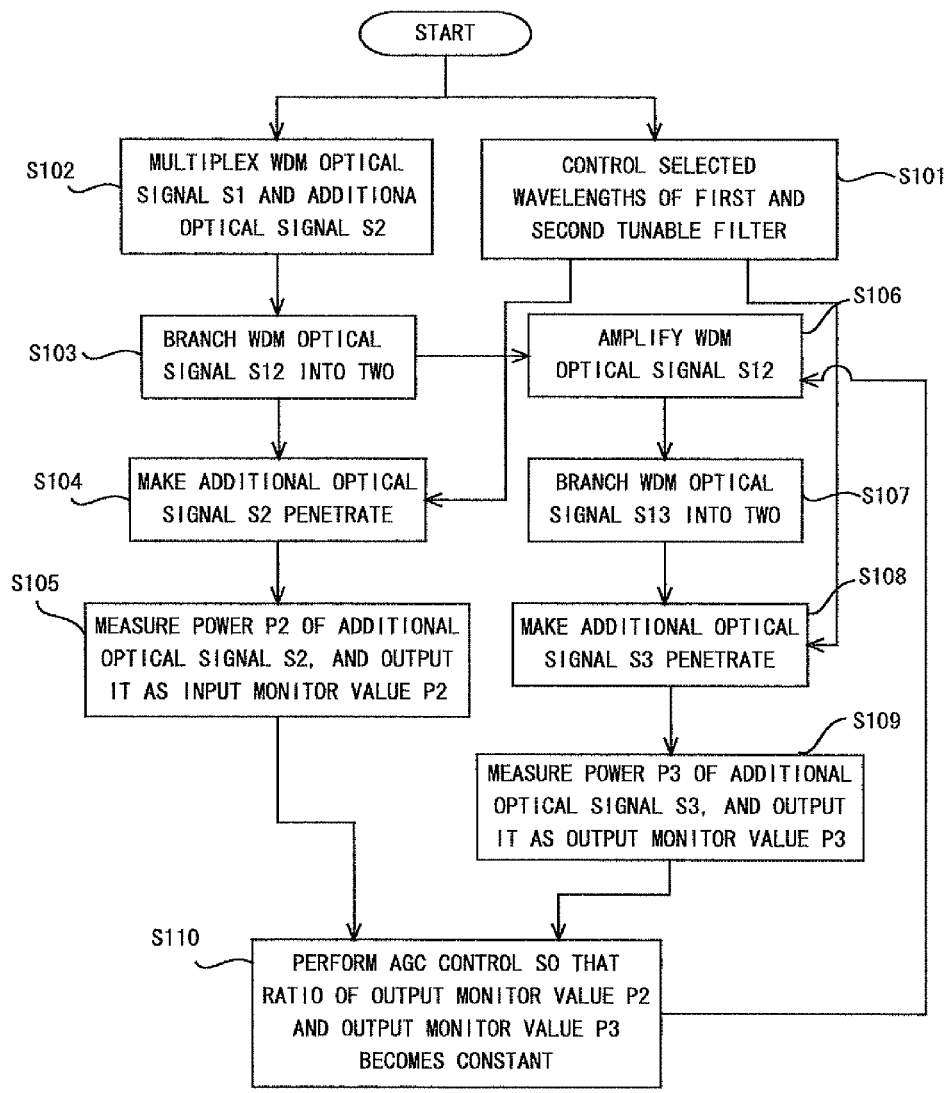
FIG. 3 is a flow chart showing a control processing flow of the optical amplification control apparatus pertaining to the one embodiment of the present invention.

Next, will be explained in detail one example of a control method of the optical amplification control apparatus 100 pertaining to the embodiment. FIG. 3 is a flow chart showing a control processing flow of the optical amplification control apparatus pertaining to the embodiment.

The second controller 11 controls the selected wavelengths in the first and second tunable filters 5 and 6 to be a wavelength of an additional optical signal, respectively based on wavelength information of the additional optical signal received from an external (not shown) (step S101).

The first optical coupler 1 multiplexes the WDM optical signal S1 and the additional optical signal S2 that are transmitted from the upstream transmission path, and outputs the multiplexed WDM optical signal S12 to the second optical coupler 2 (step S102).

The second optical coupler 2 branches the WDM optical signal S12 from the first optical coupler 1 into two, outputs one branch WDM optical signal S12 to the first tunable filter 5, and outputs the other WDM optical signal S12 to the optical amplifier 4 (step S103).

The first tunable filter 5 makes penetrate only the additional optical signal S2 in the one WDM optical signal S12 into which the second optical coupler 2 has branched and which the second optical coupler 2 has input, and outputs it to the first photodetector 8 (step S104). The first photodetector 8 measures a power of the additional optical signal S2 from the first tunable filter 5, and outputs it to the first controller 10 as the input monitor value P2 (step S105).

The optical amplifier 4 amplifies a power of the other WDM optical signal S12 into which the second optical coupler 2 has branched and which the second optical coupler 2 has input using the excitation light from the pump light source 7, and outputs it to the third optical coupler 3 (step S106). The third optical coupler 3 branches into two the WDM optical signal S13 amplified and input by the optical amplifier 4, outputs one branch WDM optical signal S13 to the second tunable filter 6, and outputs the other WDM optical signal S13 to the downstream transmission path (step S107).

The second tunable filter 6 makes penetrate only the additional optical signal S3 in the other WDM optical signal S13 from the third optical coupler 3, and outputs it to the second photodetector 9 (step S108). The second photodetector 9 measures a power of the additional optical signal S3 from the second tunable filter 6, and outputs it to the first controller 10 as the output monitor value P3 (step S109).

The first controller 10 performs AGC control so that the ratio (P2/P3) of the input monitor value P2 from the first photodetector 8 and the output monitor value P3 from the second photodetector 9 becomes constant, and outputs the control signal to the pump light source 7 (step S110).

The pump light source 7 outputs the excitation light to the optical amplifier 4 in accordance with the control signal output from the first controller 10.

Hereinbefore, in the optical amplification control apparatus 100 pertaining to the embodiment, the second optical coupler 2 branches the optical signal to which the additional optical signal with the predetermined wavelength has been added in the first optical coupler 1 that is the self node, the first tunable filter 5 extracts the additional optical signal from one optical signal into which the second optical coupler 2 has branched, the optical amplifier 4 amplifies the other optical signal into which the second optical coupler 2 has branched, the third optical coupler 3 branches the optical signal amplified by the optical amplifier 4, the second tunable filter 6 extracts the additional optical signal from one optical signal into which the third optical coupler 3 has branched, and the first controller 10 performs AGC control of the optical amplifier 4 based on the additional optical signal extracted by the first tunable filter 5 and the additional optical signal extracted by the second tunable filter 6.

As a result of this, the effect by the optical output fluctuation, such as transmission path polarization dependency and loss fluctuation, so-called fluctuation transfer, can be suppressed, and oscillation in the network can be reliably prevented. In addition, AGC control is performed based on the ratio of the powers of the additional optical signal before and after the optical amplifier 4, thereby a gain of amplification becomes constant regardless of the number of wavelengths of the optical signal input to the optical amplifier 4, and as a result of it, change of the optical power per wavelength can be suppressed. Namely, amplification of the optical signal in the network can be controlled with high accuracy.

It is to be noted that the present invention is not limited to the above-described embodiment, and that appropriate change can be made without departing from the spirit of the invention.

Although in the above-described one embodiment, the additional optical signal is added in the first optical coupler (self node) 1 that has the fewest effects by the optical output fluctuation, such as transmission path polarization dependency and loss fluctuation, the present invention is not limited to this. For example, a configuration may be employed in which the additional optical signal is added in the nearest node that has a short propagation distance of an optical transmission path and has few effects by the optical output fluctuation.

In this case, for example, a network management system that understands an operation situation of each node is provided in the network, and the optical amplification control apparatus 100 can acquire from this network management system wavelength information of an additional optical signal added at each node, etc.

This application claims priority based on Japanese Patent Application No. 2011-205101 filed on Sep. 20, 2011, and the entire disclosure thereof is incorporated herein.

REFERENCE SIGNS LIST

1 First optical coupler
2 Second optical coupler
3 Third optical coupler
4 Optical amplifier
5 First tunable filter
6 Second tunable filter
7 Pump light source
8 First photodetector
9 Second photodetector
100 Optical amplification control apparatus

What is claimed is:

1. An optical amplification control apparatus comprising:
a first optical coupler configured to branch an input optical signal of the optical amplification control apparatus into a first branched optical signal and a second branched optical signal, the input optical signal comprising a first optical signal and an additional optical signal;
a first optical filter configured to extract, from the first branched optical signal, a first filtered optical signal comprising at least a portion of the additional optical signal;
an optical amplifier configured to amplify the second branched optical signal into an amplified optical signal;
a second optical coupler configured to branch the amplified optical signal into a third branched optical signal and an output optical signal;
a second optical filter configured to extract, from the third branched optical signal, a second filtered optical signal comprising at least a portion of the additional optical signal;
a first controller configured to perform automatic gain control on the optical amplifier based on the first filtered optical signal and the second filtered optical signal; and
a second controller configured to control a selection wavelength of the first and second optical filters to extract the first and second filtered optical signals, respectively.

2. The optical amplification control apparatus according to claim 1, further comprising a third optical coupler configured to add the first optical signal and the additional optical signal into the input optical signal.

3. The optical amplification control apparatus according to claim 1, wherein the first controller is further configured to perform the automatic gain control based on a ratio of the first filtered optical signal and the second filtered optical signal.

4. The optical amplification control apparatus according to claim 1, further comprising:
a first photodetector configured to measure a power of the first filtered optical signal as an input monitor value supplied to the first controller; and
a second photodetector configured to measure a power of the second filtered optical signal as an output monitor value supplied to the first controller;
wherein the first controller is further configured to perform the automatic gain control based on a ratio of the input monitor value and the output monitor value.

5. The optical amplification control apparatus according to claim 1, further comprising a pump light source configured to generate an excitation light for the optical amplifier according to a control signal output by the first controller.

6. A control method of an optical amplification control apparatus, comprising:
branching, by a first optical coupler, an input optical signal of the optical amplification control apparatus into a first branched optical signal and a second branched optical signal, the input optical signal comprising a first optical signal and an additional optical signal;
extracting, by a first optical filter from the first branched optical signal, a first filtered optical signal comprising at least a portion of the additional optical signal;
amplifying, by an optical amplifier, the second branched optical signal into an amplified optical signal;
branching, by a second optical coupler, the amplified optical signal into a third branched optical signal and an output optical signal;
extracting, by a second optical filter from the third branched optical signal, a second filtered optical signal comprising at least a portion of the additional optical signal;
performing, by a first controller, automatic gain control on the amplification of the second branched optical signal based on the first filtered optical signal and the second filtered optical signal; and
controlling, by a second controller, a selection wavelength of the first and second optical filters to extract the first and second filtered optical signals.

7. The control method according to claim 6, further comprising:
measuring, by a first photodetector, a power of the first filtered optical signal as an input monitor value and;
measuring, by a second photodetector, a power of the second filtered optical signal as an output monitor value;
wherein performing the automatic gain control comprises performing the automatic gain control based on a ratio of the input monitor value and the output monitor value.

8. The optical amplification control apparatus according to claim 3, wherein the first controller is further configured to control the optical amplifier so that the ratio becomes a constant.

9. The optical amplification control apparatus according to claim 4, wherein the first controller is further configured to control the optical amplifier so that the ratio becomes a constant.

10. The optical amplification control apparatus according to claim 5, wherein the optical amplifier is further configured to amplify the second branched optical signal into the amplified optical signal based on the excitation light.

11. The control method according to claim 6, further comprising adding, by a third optical coupler, the first optical signal and the additional optical signal into the input optical signal.

12. The control method according to claim 6, wherein performing the automatic gain control comprises performing the automatic gain control based on a ratio of the first filtered optical signal and the second filtered optical signal.

13. The control method according to claim 12, further comprising performing the automatic gain control so that the ratio becomes a constant.

14. The control method according to claim 6, further comprising generating, by a pump light source, an excitation light based on a control signal for the automatic gain control.

15. The control method according to claim 14, wherein amplifying the second branched optical signal comprises amplifying the second branched optical signal into the amplified optical signal based on the excitation light.

16. The control method according to claim 7, further comprising performing the automatic gain control so that the ratio becomes a constant.

* * * * *